Dec. 29, 1942.   D. W. SHERMAN ET AL   2,306,846
MULTIPLE DISK BRAKE
Original Filed July 15, 1940   3 Sheets-Sheet 1
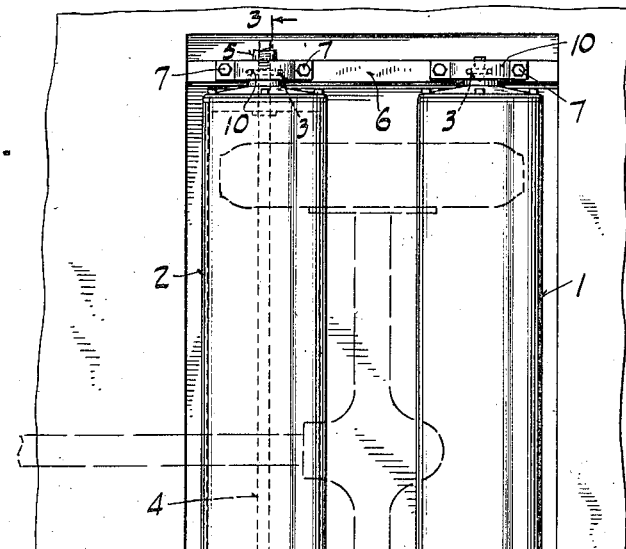
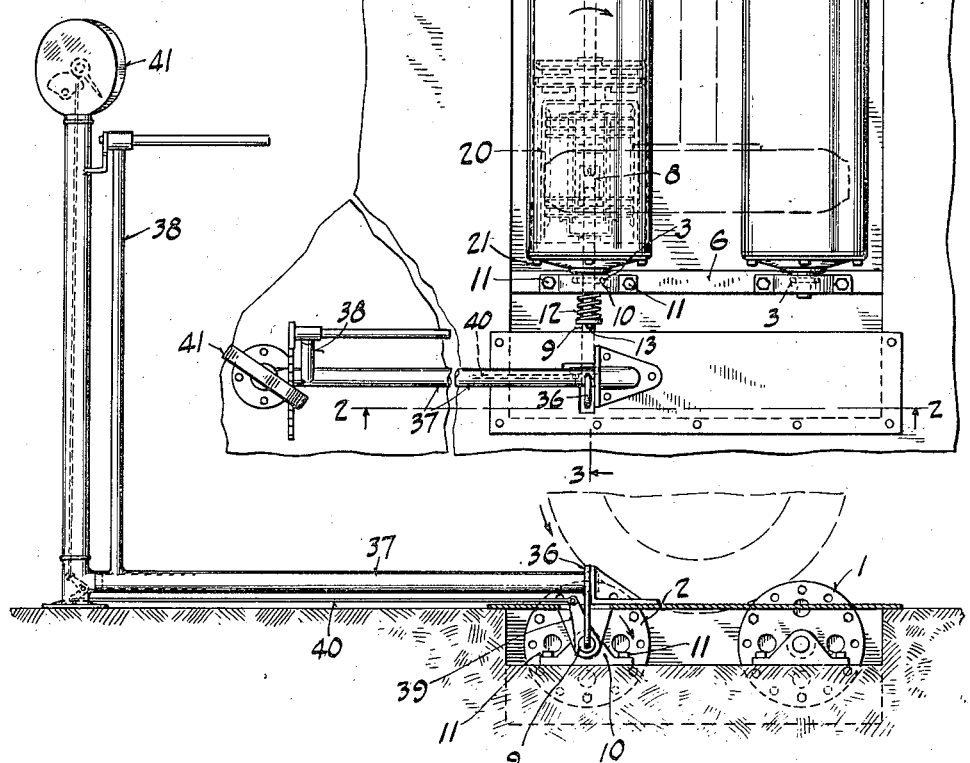
Donald W. Sherman
Oscar W. Schroeder
INVENTORS:
BY *Edwin A. Andrus*
ATTORNEY.

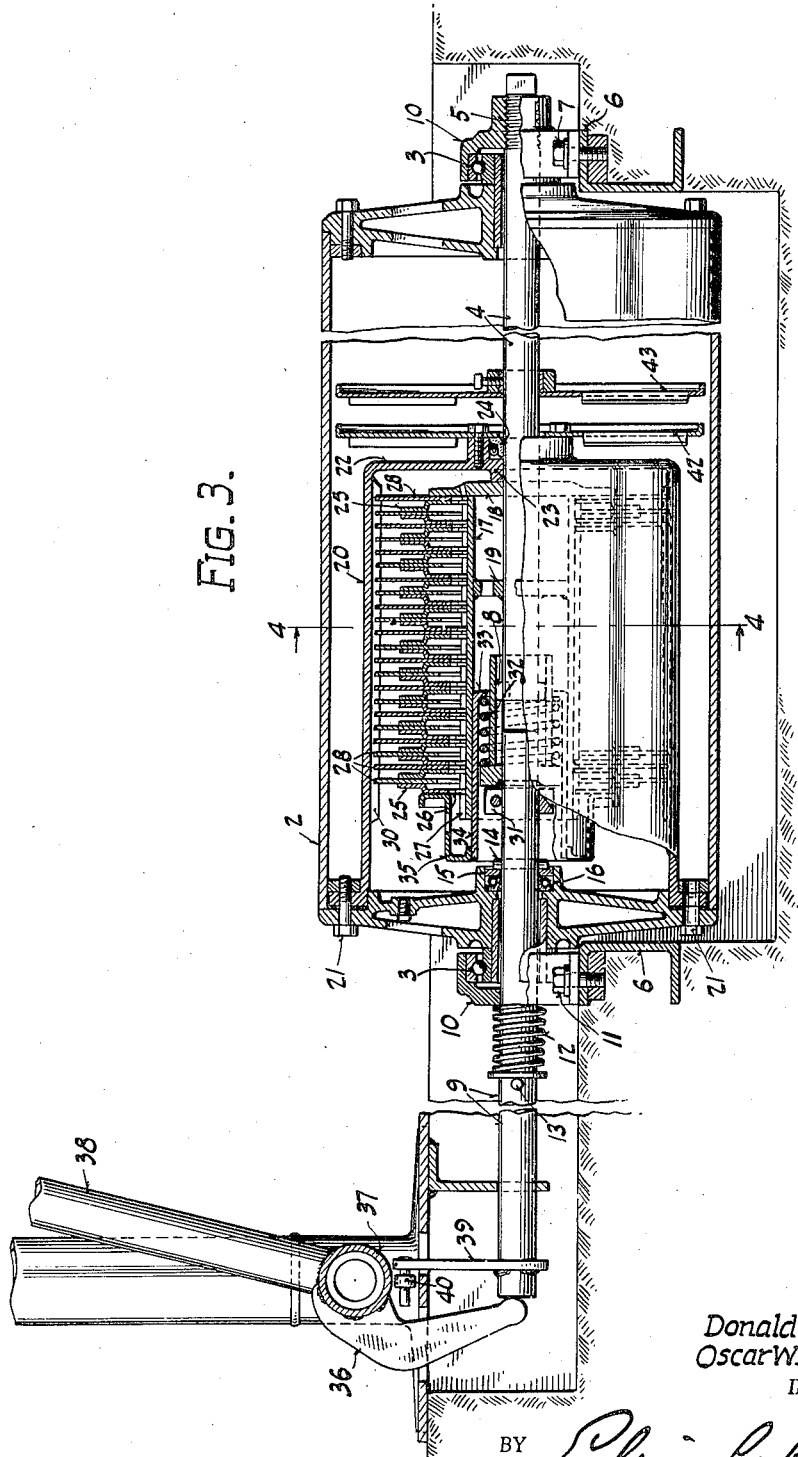

Donald W. Sherman
Oscar W. Schroeder
INVENTORS.

BY *[signature]*
ATTORNEY.

Patented Dec. 29, 1942

2,306,846

UNITED STATES PATENT OFFICE 2,306,846

MULTIPLE DISK BRAKE

Donald W. Sherman, Shorewood, and Oscar W. Schroeder, Wauwatosa, Wis., assignors to A. O. Smith Corporation, Milwaukee, Wis., a corporation of New York Original application July 15, 1940, Serial No. 345,582. Divided and this application March 24, 1941, Serial No. 384,824

7 Claims. (Cl. 188—72)

This invention relates to a multiple disk brake structure particularly adapted for use in dynamometers and wherever large amounts of energy have to be absorbed and dissipated.

The invention constitutes a division of that set forth and claimed in the original application, Serial No. 345,582, filed July 15, 1940, for Dynamometer.

The principal object of the invention is to provide a disk brake structure having a large number of disks disposed for axial movement under pressure and in which the braking pressure is equalized on the several disks.

Another object is to provide a dynamometer employing the multiple disk brake principle, and in which the disks are subject to uniform wear.

A more specific object is to provide for movement of the disks laterally after the same have tightened in the key-ways from braking pressure.

Other objects will appear hereinafter from the description of an embodiment of the invention as applied to a dynamometer illustrated in the accompanying drawings.

In the drawings:

Figure 1 is a top plan view of the dynamometer, as installed;

Fig. 2 is a side elevation of the dynamometer, partly in section on the line 2—2 of Fig. 1;

Fig. 3 is a transverse section taken longitudinally through the brake drum on line 3—3 of Fig. 1, parts being broken away;

Figure 4:
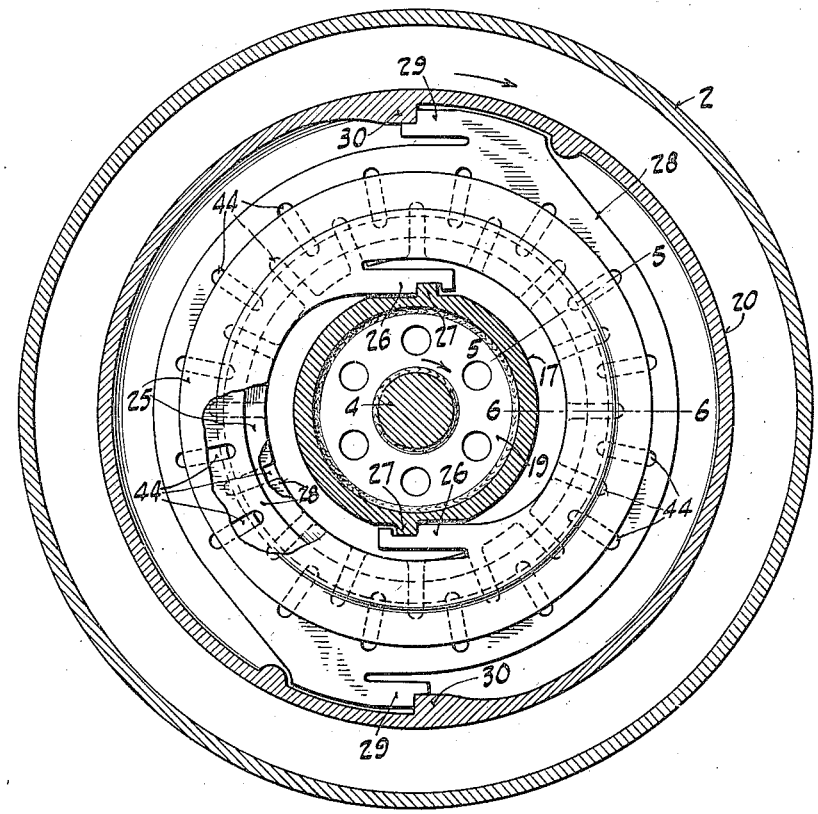
Fig. 4 is a section taken on line 4—4 of Fig. 3 showing the brake disks.
Figure 5:
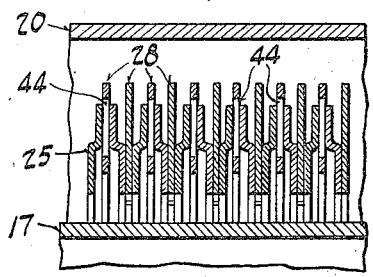
Figure 6:
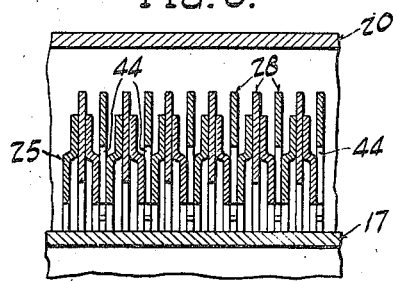

Figs. 5 and 6 are fragmentary sections taken on the line 5—5 and 6—6, respectively, of Fig. 4.

The dynamometer has two revolving drums or cylinders 1 and 2 mounted parallel in the floor of a garage and spaced to receive and support the rear wheels of an automobile. The drums are balanced for high speed rotation and are mounted on roller bearings 3 at the ends. Drum 1 is an idler drum, while drum 2 constitutes the braking drum for the dynamometer. Both drums may be braking drums if desired.

A torque shaft 4 is disposed axially of drum 2 and passes through a central opening in the right hand bearing 3, Fig. 3, the right hand end of the torque shaft being held stationary by the stationary bearing support 5 into which it is threaded and which is secured to the base 6 by bolts 7. The left hand end of shaft 4 is coupled by a spline coupling 8 to an operating shaft 9 which is disposed in alignment with shaft 4 and can receive limited longitudinal movement relative thereto.

The shaft 9 passes through a central opening in the stationary bearing support 10 secured by bolts 11 to the base 6, and the support 10 serves to house bearing 3 for supporting the left hand end of drum 2. The shaft 9 is biased to the left, Fig. 3, by the coil spring 12 engaging support 10 and a pin 13 on the shaft, the outward movement of the shaft being limited by the pin 14 engaging the bushing 15 of the oil seal 16 in the head of the drum 2.

The torque shaft 4 supports a concentric tubular member 17 by means of a right hand end bearing plate 18 which is free to turn on shaft 4 and a left hand spider 19 which is welded to the member 17 and to the shaft 4 near the left end of the latter.

A cylindrical casing 20 surrounds the member 17 and has its left hand end secured to the head of drum 2 as by bolts 21 and its right hand end closed by a head 22 forming a bearing 23 on shaft 4. An oil seal 24 is provided in the bearing 23.

In the circumferential space between member 17 and casing 20 there are a series of brake disks, alternate disks being secured to member 17 and to casing 20, respectively. The brake disks 25 which are secured to member 17 have inwardly extending flexible tongues 26 which engage at their ends with projections 27 on the member 17 to prevent relative rotary movement between the disks 25 and the member 17. The projections 27 extend longitudinally of member 17 to allow the disks 25 to slide longitudinally along the member.

The brake disks 28 disposed between disks 25 have outwardly extending flexible tongues 29 which engage projections 30 extending longitudinally on the inside of casing 20. The projections 30 provide for longitudinal movement of disks 28 in casing 20.

In operation, as the disks 25 and 29 are pressed together to apply the braking force they move relatively longitudinally and the tongues 26 and 29 slide along the respective projections 27 and 30 until they are forced to engage the projections by reason of the braking force, at which time the tongues will stop sliding. From then on the flexibility of the tongues comes into play and provides for the required final compressing of the disks together. By reason of this flexibility of the tongues 26 and 29, the disks move to effect an equal pressure on all of the disks. This is important where a large number of disks is employed.

The mechanism for pressing the disks together comprises the operating shaft 9, a flange or abutment 31 on the inner end of the shaft, a coil spring 32 disposed to have one end engaged by the abutment 31 and the other end pressed against an inner flange 33 on a tubular slide 34 mounted on the inside of member 17. The slide 34 has its outer end secured to an end plate 35 which engages the left hand disk 25. The right hand disk 28 engages the end plate 18 and the disks 25 and 28 are pressed between plates 35 and 18.

The shaft 9 is pressed inwardly, to compress the disks, by means of lever 36 engaging the outer end of the shaft and secured to a pivoted shaft 37 extending forward to a location adjacent the forward end of the automobile. A handle 38 secured to the forward end of shaft 37 provides for manual operation of it.

Assuming that an automobile is being tested and that its hind wheels are turning, thereby turning drums 1 and 2, handle 38 is operated to compress the disks and apply the braking action. As this is done, disks 25 tend to rotate with disks 28 and thereby apply a torque force through member 17 and spider 19 to shaft 4, tending to twist the latter. The twist of the left end of shaft 4 effects turning of shaft 9 and this is measured by means of a crank 39, near the outer end of shaft 9, a link 40 and a gauge 41 located near handle 38. The gauge 41 is calibrated to show the information desired as to power of the automobile engine.

In order to dissipate the heat of the brake disks 25 and 28, the casing 20 is preferably filled with a cooling fluid of oil or water. Air is circulated on the outside of casing 20 and through drum 2 by means of a fan 42 mounted on the end of casing 20 to rotate with the latter and a similar fan 43 mounted on shaft 4 to be relatively stationary. Slots 44 in the disks 28 permit circulation of cooling fluid over the braking surfaces.

The dynamometer has many advantages over the hydraulic type of dynamometer. In the present dynamometer the heat developed does not affect the reading since the latter only results from the torque transmitted to shaft 4. The large number of disks employed and the construction assuring equalization of pressure between all disks makes it possible to use the dynamometer in repeated operations without undue wear and without high maintenance cost.

Cheaper material can be utilized for the disks since the unit pressure is low. The low heat input per disk provides greater ease in cooling. All of this is a direct result of the use of flexible tongues for mounting the disks since equalization of pressure can be obtained on a large number of disks.

Various embodiments of the invention may be employed within the scope of the claims.

The invention is claimed as follows:

1. In a device of the class described, a plurality of disks disposed in axial alignment and for lateral engagement under pressure, laterally flexible means connecting alternate disks to a rotating member concentric with the disks and free to move longitudinally of the member when the disks are free from lateral pressure and torque, and laterally flexible means similarly connecting the remaining disks to a second member to resist rotation of said last referred to disks when lateral pressure is applied to the disks, said flexible means providing equalization of pressure on the disks in operation under conditions of un- equal spacing of the supporting ends of said connecting means.

2. In a device of the class described, a disk for transmitting torque load and embodying an annular friction surface for engagement with another disk, and a plurality of flexible tongues extending in the plane of the disk both radially and circumferentially to engage a member and hold the disk against rotation relative to the member while allowing axial relative movement between the disk and member within the limits of frictional movement between said member and said tongues and of flexibility of said tongues, said tongues being axially slidable along said member under conditions of low friction therebetween.

3. In a device of the class described, a disk for transmitting torque load and embodying an annular friction surface for engagement with another disk, and a pair of diametrically opposed flexible tongues extending in the plane of the disk both radially and circumferentially to engage a member and hold the disk against rotation relative to the member while allowing axial relative movement between the disk and member within the limits of frictional movement between said member and said tongues and of flexibility of said tongues, said tongues being axially slidable along said member under conditions of low friction therebetween.

4. In a device of the class described, a disk for transmitting torque load and embodying an annular friction surface for engagement with another disk, and a plurality of flexible tongues extending in the plane of the disk both radially and circumferentially to engage a member and hold the disk against rotation relative to the member while allowing axial relative movement between the disk and member within the limits of flexibility of said tongues, the engagement of said tongues and member providing an interlock through complementary groove and projection means extending axially of the parts to provide for free axial relative movement between the tongues and member at all times except when the torque load being transmitted is sufficiently high to prevent relative slippage of the interlocking parts.

5. In a device of the class described, a disk for transmitting torque load and embodying an annular friction surface for engagement with another disk, and a flexible tongue extending in the plane of the disc both radially and circumferentially to engage a member and hold the disk against rotation relative to the member while allowing axial relative movement between the disk and member within the limits of flexibility of said tongue, the engagement of said tongue and member providing an interlock through complementary groove and projection means extending axially of the parts to provide for free axial relative movement between the tongue and member at all times except when the torque load being transmitted is sufficiently high to prevent relative slippage of the interlocking parts.

6. In a device of the class described, a plurality of disks disposed in axial alignment and for lateral engagement under pressure, alternate disks having means providing a longitudinally sliding contact with a rotating member to effect rotation of said disks with said member, the remaining disks having means providing a longitudinally sliding contact with a second member to resist rotation of said last referred to disks by said first named disks when lateral pressure is applied to the disks, and means providing for the longitudinal movement of said disks under pressure after said sliding contacts reach the limit of movement under load.

7. In a device of the class described, a plurality of disks disposed in axial alignment and for lateral engagement under pressure, alternate disks having means providing a longitudinally sliding contact with a rotating member to effect rotation of said disks with said member, the remaining disks having means providing a longitudinally sliding contact with a second member to resist rotation of said last referred to disks by said first named disks when lateral pressure is applied to the disks, and laterally flexible means between said contacts and said disks to allow said disks to move relatively longitudinally under pressure after said sliding contacts reach the limit of movement under load.

DONALD W. SHERMAN.
OSCAR W. SCHROEDER.